United States Patent [19]
Carlson

[11] 4,300,264
[45] Nov. 17, 1981

[54] CLAM BELLY EXTRACTOR

[76] Inventor: Harold C. Carlson, P.O. Box 06062, Fort Myers, Fla. 33906

[21] Appl. No.: 123,780

[22] Filed: Feb. 22, 1980

[51] Int. Cl.³ .......................................... A22C 29/00
[52] U.S. Cl. .......................................... 17/51; 17/53
[58] Field of Search .............................. 17/53, 51, 48

[56] References Cited

U.S. PATENT DOCUMENTS

| | | | |
|---|---|---|---|
| 3,408,686 | 11/1968 | Stephenson | 17/51 X |
| 3,688,344 | 9/1972 | Carlson | 17/53 |
| 4,148,112 | 4/1979 | Marvin | 17/53 |

FOREIGN PATENT DOCUMENTS 514600  9/1976  U.S.S.R. ................................ 17/53

*Primary Examiner*—Willie G. Abercrombie
*Attorney, Agent, or Firm*—Harvey B. Jacobson

[57] ABSTRACT

A high pressure and velocity water drive pipe is provided having inlet and outlet ends. The outlet end of the drive pipe extends and is secured horizontally through one side of a generally cylindrical tank and terminates between 2 and 3½ inches from the inner surface of the opposite side of the tank. The tank includes a lower gravity outlet having an effective cross-sectional area appreciably more than the effective cross-sectional area of the drive pipe outlet end and the drive pipe includes structure defining a venturi zone therein into which the outlet end of a seafood meat supply line opens. Seafood meat is educted from the meat supply line into the drive pipe and accelerated therein for discharging from the outlet end thereof under high speed and pressure conditions for impacting with the inner surface of the opposing tank wall under the level of water within the tank, whereby impacting of the meat with the tank side wall may effectively substantially completely separate the bellies from the clam bodies and subsequent turbulation of water within the tank before its discharge therefrom together with the seafood meat will be operative to effect final separation of the clam bellies from the clam meats.

10 Claims, 4 Drawing Figures

CLAM BELLY EXTRACTOR

BACKGROUND OF THE INVENTION

The clam belly extractor comprises an improvement over my prior U.S. Pat. No. 3,688,344, and also an improvement over the somewhat similar structure disclosed in U.S. Pat. No. 4,148,112, dated Apr. 10, 1979, to John Marvin.

Although the debellying apparatus and method disclosed in Marvin is, to a reasonable extent, operative to perform the intended function, it has been found that either the hydraulic shearing action sufficient to separate the bellies from the remainder of the clam meat is too severe and results in partial shredding of the remaining clam meat or insufficient belly separation is effected.

Accordingly, a need exists for an apparatus and method which will function to effectly separate clam bellies from the remainder of the clam meats in a manner which will not result in damage to the remaining clam meats.

BRIEF DESCRIPTION OF THE INVENTION

The method and apparatus of the instant invention is functional to effect a hydraulic shearing action on the whole clams being processed for the purpose of substantially loosening the bellies from the remainder of the clam meats and is thereafter operative to propel, by fluid stream, the clam meats with partially separated bellies against a submerged impact surface. The underwater impacting of the whole clams against the impact surface substantially fully completes the process of separating the bellies from the remainder of the clam meats and the clams being processed are thereafter subject to considerable turbulence within the tank to complete the belly separating process before the clams reach and are discharged through the tank gravity outlet.

The main object of this invention is to provide an apparatus for efficiently fully separating clam bellies from the remainder of the clam meats and which functions in a manner which does not subject the desirable clam meat portions to excessive hydraulic shearing forces.

Another object of this invention is to provide a method and apparatus for separating bellies from the remainder of clam meats and which is operative in a high volume production environment.

A final object of this invention to be specifically enumerated herein is to provide a method and apparatus for separating the bellies from the remaining portions of clam meats and which will conform to conventional forms of manufacture, involve simple construction and enable the utilization of substantially unskill work people so as to provide a method and apparatus which will be economically feasible, involve low maintenance and provide employment for minimum skilled labor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged transverse vertical sectional view taken substantially upon the plane indicated by the section line 3—3 of FIG. 2; and FIG. 4 is a fragmentary sectional view taken substantially upon the plane indicated by the section line 4—4 of FIG. 2.

DETAILED DESCRIPTION OF THE INVENTION

Figure 1:
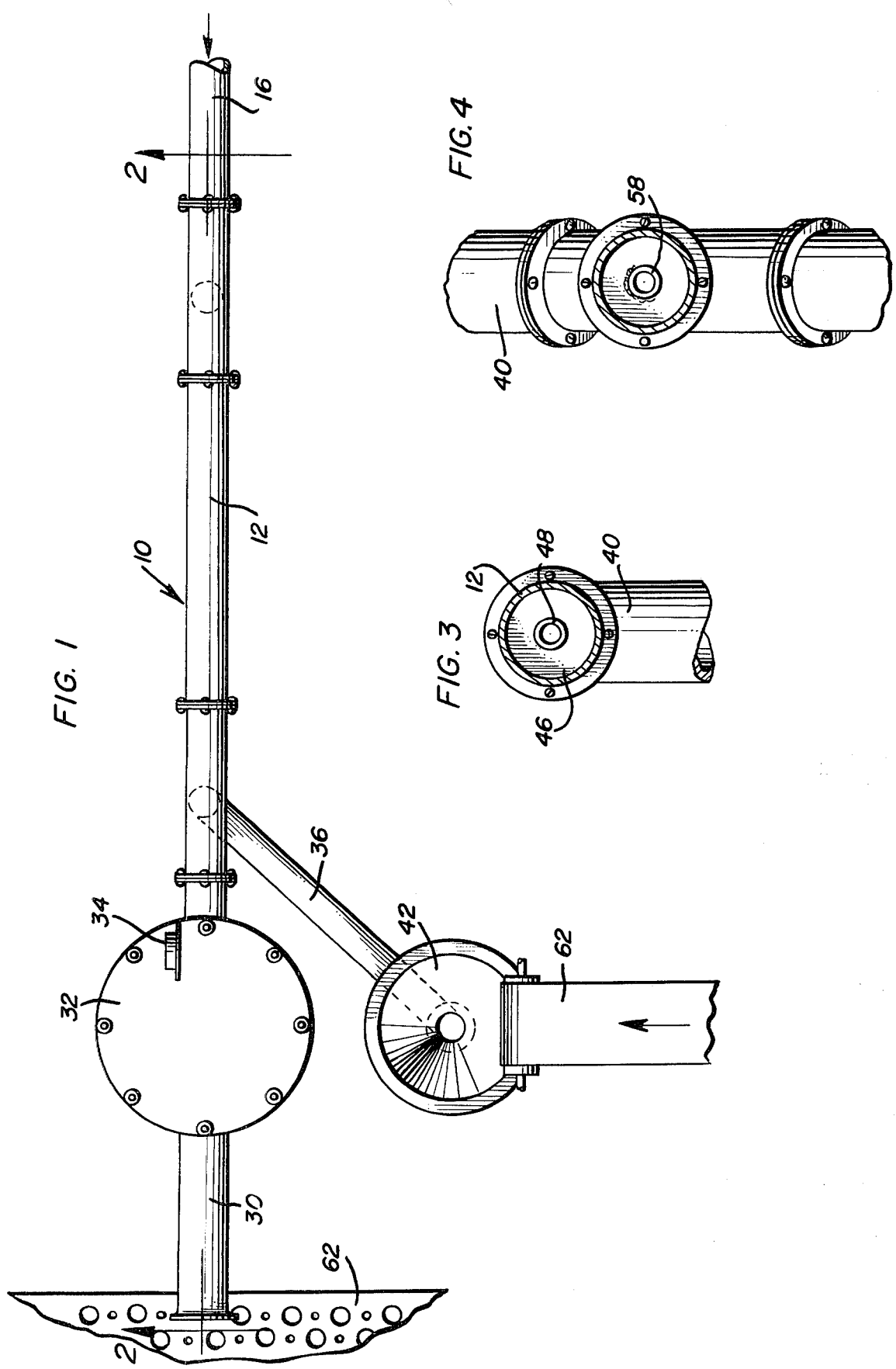
FIG. 1 is a fragmentary top plan view of the apparatus of the instant invention.
Figure 2:
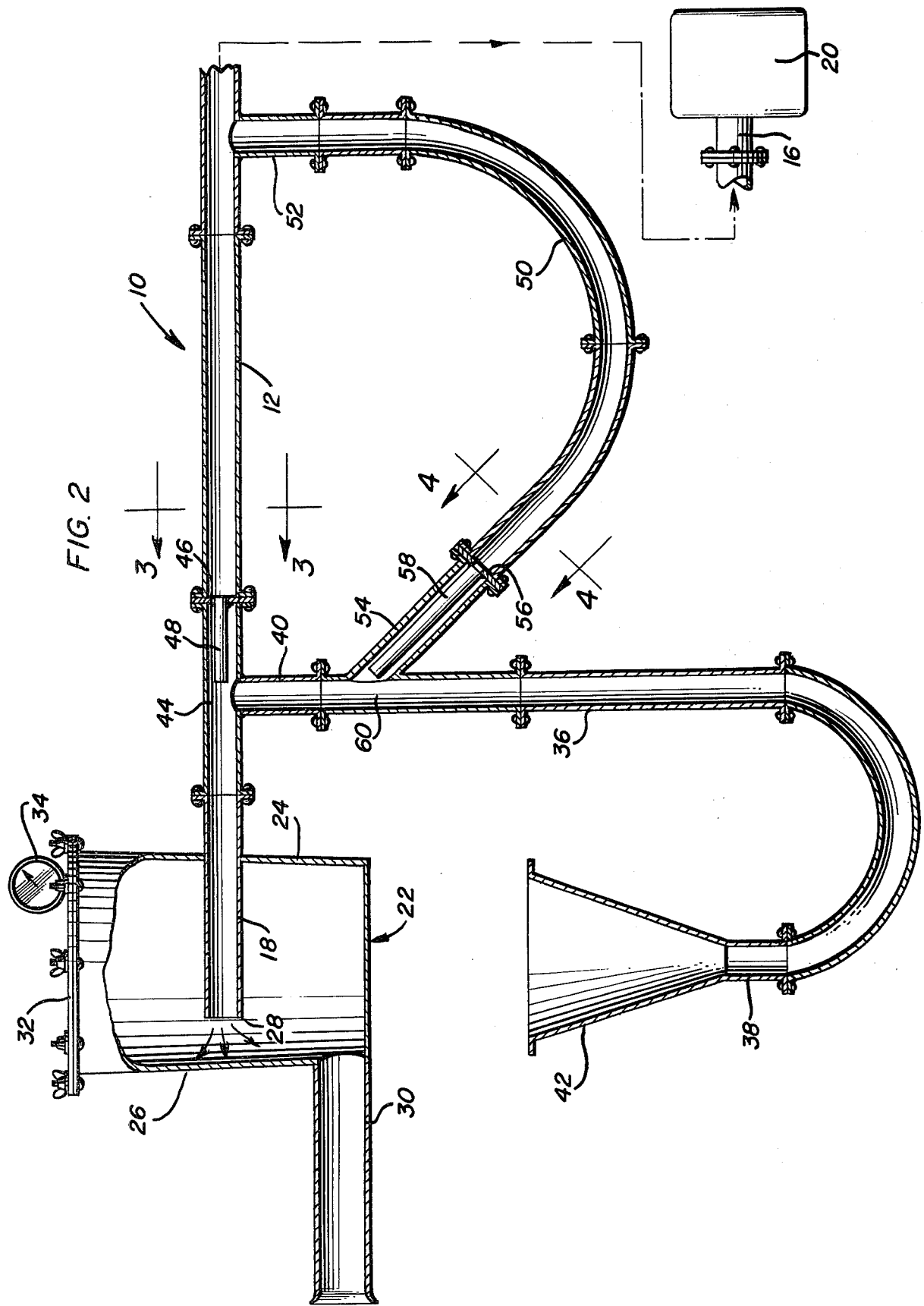
FIG. 2 is a fragmentary vertical sectional view taken substantially upon the plane indicated by the section line 2—2 of FIG. 1.

Referring now more specifically to the drawings, the numeral 10 generally designates the apparatus of the instant invention. The apparatus 10 includes a drive pipe 12 having inlet and outlet end portions 16 and 18 and the inlet end portion 16 is operatively associated with a source 20 of water under pressure.

A turbulation tank is referred to in general by the reference numeral 22 and the outlet end portion 18 of the drive pipe 12 projects through one wall 24 of the tank 22 and terminates a spaced distance from the opposite wall 26 of the tank 22. The drive pipe 12 is generally 2 inches in diameter and the spacing between the wall 26 and the terminal end 28 of the outlet end portion 18 of the drive pipe 12 is between 2 and $3\frac{1}{2}$ inches, preferably $2\frac{3}{8}$ inches.

The tank 22 is substantially cylindrical in configuration although it tapers slightly in diameter toward its lower end portions and the lower end of the tank 22 includes a gravity outlet 30 which is approximately 3 inches in diameter. The upper end of the tank 22 is provided with a removal closure wall 32 and a pressure gauge 34 opening through the closure wall into the interior of the tank 22 is supported from the closure wall 32.

A supply line 36 is provided and includes an inlet end 38 and an outlet end 40. The inlet end 38 is provided with a funnel 42 for receiving whole clam meats and the outlet end 40 opens into a venturi zone 44 of the drive pipe 12 intermediate its opposite ends. The venturi zone 44 is defined by a transverse partition 46 mounted within the drive pipe 12 upstream from the zone 44 and a center tubular nozzle 48 supported from an opening through the partition 46. The nozzle 48 is approximately $\frac{5}{8}$ of an inch in diameter and extends downstream within the drive pipe 12 from the partition 46 to the zone 44 of the drive pipe 12 into which the outlet end 40 of the supply pipe 36 opens.

A bypass pipe 50 is provided and includes an inlet end 52 and an outlet end 54. The inlet end 52 opens into the drive pipe 12 upstream from the partition 46 and the outlet end 54 of the bypass pipe 50 opens into the outlet end portion of the supply pipe 36 in an attitude inclined downstream relative to the supply pipe 36. The bypass pipe 50 includes a transverse partition 56 corresponding to the partition 46 and the partition 46 includes a nozzle 58 corresponding to the nozzle 48. The outlet end of the nozzle 48 terminates substantially at the point the outlet end 54 of the bypass pipe 50 opens into the outlet end portion of the supply pipe 36.

In operation, water is supplied to the inlet end portion 16 at generally 120 psig and at a volume of approximately 160 gallons per minute. Approximately one-half of the water supplied to the inlet end portion 16 is jetted from the nozzle 48 while the other half volume of water is discharged from the nozzle 58. The nozzle 58 effects a vacuum in the supply pipe 36 upstream from the zone 60 of the pipe 36 into which the outlet end 54 of the bypass pipe opens and thereby enables a high volume rate of whole clam meats to be discharged into the funnel from a conveyor 62. As the clam meats fall into the funnel and subsequently into the inlet end 38 of the supply pipe 36, they are drawn by vacuum (approximately 27 inches) through the supply pipe 36 and propelled into the zone 44 with turbulence and a slight shearing action being imparted to the clams as they pass through zone 60 and into zone 44. Of course, as the clam meats pass into the zone 44, a second more forceful shearing action, similar to, but less than, that disclosed in the above mentioned Marvin patent, occurs and the partially processed clam meats are propelled at somewhat reduced velocity through the outlet end portion 18 and impacted with the inner surface of the wall 26.

As a result of the partial shearing action and turbulation effected within zone 60 and the increased shearing action effected in the zone 44, the bellies of clams are substantially loosened relative to the remainder of the clam meats without perforation and tearing of the remaining clam meats. Then, as a result of the high speed impacting of the partially processed clams with the inner surface of the wall 26, the clam bellies are further separated from the remaining clam meats and as the water and clams move from the impact area of the inner surface of the wall 26 through the tank toward the gravity outlet 30, the clam meats and bellies are subjected to heavy turbulence resulting in any clam bellies remaining attached to the clam meats being finally separated therefrom. The water and separated clam meats and bellies then flow from the gravity outlet 30 onto a shaker table 62 wherein the water and clam bellies are fully separated from the remaining clam meats.

As in the case of the $\frac{3}{8}$ inch venturi nozzle utilized in the Marvin patent structure above referred to, a severe hydraulic shearing action is effected. However, with approximately the same water pressure, the instant invention effects an initial acceleration of the whole clams and a minor shearing action in zone 60 and a medium hydraulic shearing action (as opposed to a more severe shearing action) in the zone 44 resulting in only partial separation of the clam bellies from the clam meats but with less damage to the clam meats. Thereafter, impacting the clam meats and the bellies against the inner surface of the wall 26 and subsequent heavy turbulence of the water, clam meats and clam bellies within the tank 22 during movement toward the gravity outlet 30 effects final and more complete separation of the clam bellies from the clam meats.

It is also pointed out that the instant invention does not require the knife-like projections (11) disclosed in the above-mentioned Marvin patent in order to effect a slitting of the peritoneum for preloosening the belly from the remaining clam meat. Accordingly, considering a volume of approximately 2000 to 3000 pounds of whole clam meats being processed each hour of operation of the apparatus 10, and accordingly the number of whole clam meats which would otherwise be caused to pass between similar knife-like projections, is eliminated along with the inherent unnecessary slitting of the desirable clam meat portions. The resultant end product obtained through the utilization of the apparatus 10 comprises clam meats with the bellies removed and without the clam meats being perforated, torn or slit.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for separating attached, desirable and undesirable portions of seafood, said apparatus including a high velocity water drive pipe having inlet and outlet ends, a closed pressure and turbulence tank into which said outlet end opens and adapted to receive water discharged from said outlet end, said inlet end being communicated with a source of water under pressure, a seafood meat supply line including inlet and outlet ends, said drive pipe including structure defining a venturi zone therein intermediate said inlet and outlet ends, said supply line outlet end opening into said venturi zone, said outlet end of said drive pipe projecting generally horizontally into said tank through a first side wall portion thereof and extending toward and terminating a distance generally horizontally spaced between 2 and 3½ inches from the inner surface of a second imperforate side wall portion of said tank remote from said first wall portion, said tank including a gravity flow outlet of greater effective cross-sectional flow area than said drive pipe outlet end, said outlet being spaced below said wall portions.

2. The combination of claim 1 wherein said source of water under pressure is operative to supply water under pressure to said inlet end of said supply pipe at a pressure and rate operative to maintain between 4 and 12 psig in said tank.

3. The combination of claim 1 wherein said source of water under pressure is operative to pump water under pressure through said drive pipe at a rate of approximately 160 gpm.

4. An apparatus for separating attached, desirable and undesirable portions of seafood, said apparatus including a high velocity water drive pipe having inlet and outlet ends, a tank into which said outlet end opens and adapted to receive water discharged from said outlet end, said inlet end being communicated with a source of water under pressure, a seafood meat supply line including inlet and outlet ends, said drive pipe including structure defining a venturi zone therein intermediate said inlet and outlet ends, said supply line outlet end opening into said venturi zone, said outlet end of said drive pipe projecting into said tank through a first wall portion thereof and extending toward and terminating a distance spaced from the inner surface of a second wall portion of said tank remote from said first wall portion, said tank including a gravity flow outlet of greater effective cross-sectional flow area than said drive pipe outlet end, a bypass line having inlet and outlet ends, said bypass line inlet end opening into said drive pipe upstream from said venturi zone and the outlet end of said bypass line opening into said supply line intermediate the inlet and outlet ends thereof and in a direction inclined in a downstream direction relative to said supply line.

5. The combination of claim 4 wherein the upstream end of said venturi zone in said drive line is defined by a restricted diameter orifice.

6. The combination of claim 5 wherein said outlet end of said bypass line opens into said supply line through a restricted diameter orifice.

7. The combination of claim 6 wherein said supply line includes a water trap zone therein intermediate the inlet end thereof and the juncture of said bypass line with said supply line.

8. An apparatus for separating attached desirable and undesirable portions of seafood, said apparatus including a high velocity water drive pipe having inlet and outlet ends, a closed pressure and turbulence tank into which said outlet end opens and adapted to receive water discharged from said outlet end, said inlet end being communicated with a source of water under pressure, a seafood meat supply line including inlet and outlet ends, said drive pipe including structure defining a venturi zone therein intermediate said inlet and outlet ends, said supply line outlet end opening into said venturi zone, said outlet end of said drive pipe being generally horizontal and disposed within said tank, said tank including an upstanding abutment surface disposed generally normal to and spaced between 2 and 3½ inches from the terminal end of said drive pipe outlet end, said tank including a gravity flow outlet of greater effective cross-sectional area than said drive pipe outlet end.

9. A method for separating the bellies of clams from the remainder of the clam meat comprising the steps of introducing a stream of whole clam bodies laterally into an elongated lengthwise moving liquid shearing zone by providing a clam introduction conduit lengthwise discharging laterally into said zone, continuously introducing a high velocity stream of liquid into said shearing zone in such a manner that said whole clam bodies are asperated into said liquid shearing zone by the vacuum created by said high velocity stream of liquid flowing past the point where said clam body introduction conduit opens into said liquid shearing zone, said high velocity stream of liquid creating forces sufficient to partially shear the bellies from said whole clam bodies, forming a turbulent liquid bath confined on at least one side by an upstanding wall, high speed impacting said bodies generally horizontally against said wall beneath the upper surface of said bath by endwise discharging said liquid stream and clam bodies from said drive pipe onto said wall from a discharge location spaced between 2 and 3½ inches from said wall and thereby subsequently subjecting the impacted clam bodies to the turbulence of said bath.

10. A method for separating the bellies of clams from the remainder of the clam meat comprising the steps of introducing a stream of whole clam bodies laterally into an elongated lengthwise moving liquid shearing zone by providing a clam introduction conduit lengthwise discharging laterally into said zone, continuously introducing a high velocity stream of liquid into said shearing zone in such a manner that said whole clam bodies are asperated into said liquid shearing zone by the vacuum created by said high velocity stream of liquid flowing past the point where said clam body introduction conduit opens into said liquid shearing zone, said high velocity stream of liquid creating forces sufficient to partially shear the bellies from said whole clam bodies, high speed impacting said bodies against an abutment surface by endwise discharging said liquid stream and clam bodies from said drive pipe onto a transverse abutment surface spaced between 2 and 3½ inches from the drive pipe terminal end and subjecting the impacted clam bodies to liquid turbulence by positioning the transverse abutment surface within a closed restricted volume tank having a lower gravity outlet, subjecting said clam bodies to acceleration and a preliquid shearing action by introducing a high speed jet of liquid into said clam introduction conduit in a downstream inclined direction and at a point upstream from the point of discharge of said clam introduction conduit into said venturi zone.

* * * * *